Sept. 30, 1930. H. S. HOLMES 1,776,855
MAKING FLANGED TUBES AND THE LIKE
Filed Jan. 23, 1929
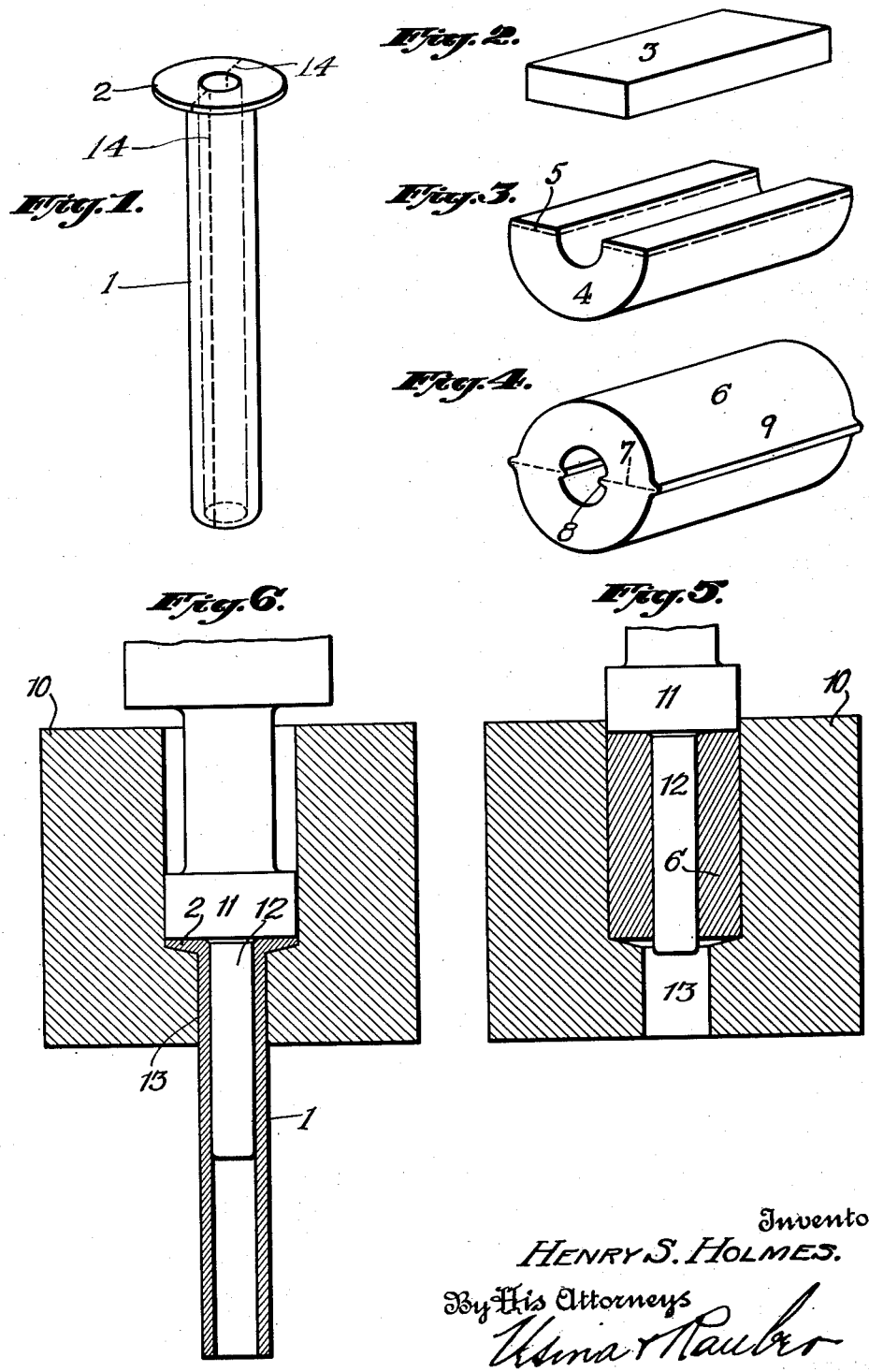
Inventor
HENRY S. HOLMES.
By his Attorneys Patented Sept. 30, 1930

1,776,855

UNITED STATES PATENT OFFICE

HENRY S. HOLMES, OF NEW YORK, N. Y., ASSIGNOR, BY MESNE ASSIGNMENTS, TO METROPOLITAN ENGINEERING COMPANY, A CORPORATION OF NEW YORK

MAKING FLANGED TUBES AND THE LIKE

Application filed January 23, 1929. Serial No. 334,380.

The usual methods of making a flanged tube are by upsetting the end of a piece of seamless tubing or by welding or otherwise applying a flange formed separately, as by drop forging. These methods require several operations.

In case the wall of the tube is thin compared with the flange thickness desired, the first method is almost impossible. The present invention provides a more economical method of making such tubes and similar articles and a method which is adaptable to the making of products of almost all dimensions.

The accompanying drawings illustrate the invention.

Fig. 1 is a perspective of a completed tube;

Figs. 2, 3 and 4 are perspective views of the initial blank and subsequent shapes produced;

Figs. 5 and 6 are vertical sections illustrating the start and the finish of a forging and extruding operation.

The tube comprises a hollow stem 1 with an outward flange 2 of tapered thickness and of considerable width. The wall thickness, as shown by the dotted lines in Fig. 1, is small in comparison with the diameter of the tube, about one-sixth in the case illustrated.

The tube is made by a forging operation on a hollow slug which is made by the welding together of two thick short segments bent up from correspondingly thick flat blanks.

Fig. 2 shows the flat blank 3 of rectangular shape such as can be cut from a rolled rod or bar of the given cross-section. The blank 3 is bent or forged to a segment 4 slightly greater than a semi-circle so as to leave a slight excess of metal indicated at 5 for extrusion or take-up in the welding operation. Two such segments are butt-welded together along their longitudinal edges to form the short thick tube or slug 6.

Preferably the Murray method of welding is used in which the parts are pressed together while a current of high density is passed across the joint. The location of the joint is indicated at 7. The take-up of the metal forms rough burrs 8 and 9 on the inside and the outside of the joints. These are removed, leaving a smooth short thick tubular blank for the next operation.

The Murray method is described in reissue Patent No. 15,466 of October 10, 1922. This provides an economical method of making the short thick tubular blanks. Experiments indicate that the Murray method produces the only type of weld which will stand the subsequent forging operation without fracture.

The tubular blank 6 is then heated and placed in the forging die 10, Fig. 5, which is supported on the bed of a press. The press has a movable ram which carries a punch 11 with a core extension 12 fitting within the blank. As the punch enters and moves down in the die 8, it extrudes the hot metal out of the bottom opening 13 in the space around the extension 12 (Fig. 6) and thus extends the metal lengthwise and reduces its cross-section to form the elongated thin-walled tube 1. The width of the flange is the thickness of the tubular blank and the external diameter of the flange is the same as that of the tubular blank. The flange thickness is regulated as desired by the distance through which the punch moves in the die.

By this method the short welding burrs 8 and 9 constitute practically all of the scrap. This is a small quantity compared with the waste involved in welding a drop forged flange to a tube.

The invention is chiefly of value in making tubes of iron or steel, but may be used with other metals. The shape of the flange can be varied by suitably shaping the punch and die, and the cross-section of both the tube and the flange can be other than circular by suitably shaping the tubular blank and the segments from which it is formed. Also the desired tubular blanks can be welded or made in other ways than that described, and the method generally can be varied by those skilled in the art without departing from the invention as defined in the following claims.

As shown in Fig. 1, the forged tube consists of two segments welded together along the line 14 corresponding to the longitudinal edges of the segments, and each segment is an integral forging including half of the stem and half of the flange.

The tube illustrated is adapted to be used for the flanged ends of rear axle housings of automobiles. Flanged tubes for other purposes and of different dimensions and proportions may be made by the same method.

What I claim is:

1. The method of making a flanged tube, having a wall relatively thin compared to its diameter, which consists in bending thick flat blanks to segmental shape, uniting such segments by welding along longitudinal edges to form a short thick tubular blank, and extruding such blank to form a relatively long tube having a relatively thin wall and a flange.

2. The method of making a flanged tube which consists in making hollow segments of a thickness as great as the width of the desired flange, welding them edge-to-edge to form a thick tubular blank and extruding said blank so as to extend the length and reduce the thickness of the greater portion thereof to form an elongated thin-walled tube with a comparatively wide flange on the end.

3. The method of making a flanged tube which consists in bending thick flat blanks to to form hollow segments of a thickness as great as the width of the desired flange, welding them edge-to-edge to form a thick tubular blank and extruding said blank so as to extend the length and reduce the thickness of the greater portion thereof to form an elongated thin-walled tube with a comparatively wide flange on the end.

In witness whereof, I have hereunto signed my name.

HENRY S. HOLMES.